United States Patent

Ferrara et al.

[15] 3,661,509
[45] May 9, 1972

[54] CATALYTIC PROCESS FOR THE PURIFICATION OF GASES AND CATALYTIC COMPOSITIONS SUITABLE THEREFOR

[72] Inventors: Italo Ferrara; Italo Castellani, both of Siracusa, Italy

[73] Assignee: Simcat-Societa Industriale Catanese S.p.A., Palermo, Italy

[22] Filed: June 20, 1969

[21] Appl. No.: 838,028

Related U.S. Application Data

[63] Continuation of Ser. No. 494,884, Oct. 11, 1965, abandoned.

[30]     Foreign Application Priority Data

Oct. 20, 1964   Italy......................................22648/64

[52] U.S. Cl.......................................23/2 S, 23/4, 252/439, 252/475
[51] Int. Cl. ....................................B01d 53/04, B01d 53/34
[58] Field of Search........................23/2, 2.1, 3, 3.1, 4; 55/72

[56]                References Cited

UNITED STATES PATENTS 3,194,629   7/1965   Dreibelbis et al............................23/2

*Primary Examiner*—Earl C. Thomas
*Attorney*—Stevens, Davis, Miller & Mosher

[57]                ABSTRACT

Gases contaminated with mercury are purified by bringing the same into intimate contact with a catalytic composition comprised of mercuric sulfide and sulfur.

2 Claims, No Drawings

CATALYTIC PROCESS FOR THE PURIFICATION OF GASES AND CATALYTIC COMPOSITIONS SUITABLE THEREFOR

This application is a continuation of application Ser. No. 494,884 filed Oct. 11, 1965 and now abandoned.

The present invention relates to a process for the purification of gases contaminated with mercury and to compositions suitable for the catalysis thereof. A particularly beneficial use of these new compositions is as a filtering medium for gas masks employed in atmospheres polluted by mercury.

The poisonous effects of mercury are well known. The prolonged absorption of even the smallest quantities of mercury via the respiratory organs adversely affects the nervous system. The absorption of major quantities causes more serious problems and particularly the kidneys. Acute poisoning can result in death.

The maximum concentration of mercury in the air that can be tolerated for a long period of time without damage to one's health amounts to about 0.1 mg/m$^3$. Considering that air saturated with mercury at 25° C contains about 19 mg/m$^3$ thereof, it is understandable how many cases of intoxication due to mercury poisoning have been reported in various industries wherein such processes utilizing mercury are conducted.

This invention offers yet another field of application in the purification of gases which are to be used in processes wherein the presence of mercury is noxious. In the chemical industry the presence of mercury in the processed gases, can, for example, result in contamination of the catalysts.

Accordingly, one of the objects of this invention is to provide a process which affords a total or substantially total purification of gases contamined with mercury.

Another object of this invention is that of providing catalytic compositions suitable for this purpose, having optimum mechanical resistance and which are not affected by moisture, and which are, furthermore, characterized by long lives and and ease of regeneration.

A still further object still of this invention is that of providing filtering compositions for gas masks which are to be used in atmospheres contaminated with mercury.

According to the purification of this invention, the gas contamined with mercury is brought into contact with a catalytic composition comprising mercuric sulfide and sulfur. It has been established that such composition has a very high mercury absorption power. It has also been ascertained that this power is due to the catalytic action developed by the mercuric sulfide on the reaction of absorption of the mercury and carried out by the sulfur.

The catalytic composition is fixed on a suitable carrier such as, for example, active carbon or alumina, in any one of the methods for carrying out this invention. The quantity of sulfur and mercuric sulfide fixed per unit weight of carrier may vary over a wide range; as a matter of fact, very good results are obtained with catalysts containing only about 10 mg. of HgS and about 1 mg of S per gram of carrier, as well as with catalysts containing far greater quantities thereof, for example, on the order of several hectograms HgS and fewer hectograms S per gram of carrier, as well as with catalysts that contain intermediate quantities.

For example, very good results are obtained with different qualities of active carbon or alumina by fixing from about 60 to 80 mg of mercuric sulfide and from 5 to 10 mg of sulfur per gram of carrier.

The sulfur itself may serve as a carrier. The catalyst in this instance will consist of crystalline sulfur, whose granules have been partially coated with mercuric sulfide.

It goes without saying that the use of different carriers for the preparation of the aforesaid catalysts, when suitably selected, will afford equally good results.

The catalyst can be used over wide ranges of temperatures and pressures. Good results have been achieved at atmospheric pressure, as well as at pressures of up to about 30 atm. In regards temperature, one can operate at room temperature, as well as at lower temperatures (from 0° to 10° C, for example) or at higher temperatures (for example at 75° C). When operating at temperatures higher than room temperature, with certain catalyst formulations, one may encounter the drawback of the gas to be purified contaminated with small quantities of sulfur. Such a drawback can be eliminated by allowing the sulfur to be absorbed by active carbon in a successive absorption tower kept at room temperature.

The concentration of the mercury in the gas to be purified does not, in practice, have any influence on the quality of the results obtained. Good results are obtained regardless of whether it has been operated with a gas having a low content of mercury (i.e., 250$\gamma$/m$^3$–standard conditions) or with gases saturated or substantially saturated with mercury. The symbol "gamma" is utilized to indicate "microgram."

The space velocity of the gas to be purified may also vary over a wide range. Good results have been obtained with space velocity of about 10,000 per hour. In one of the preferred embodiments of this invention, use is made of space velocity of from about 3,000–4,000 per hour.

The catalyst may be prepared in the following manner: the carrier, for example, active carbon, alumina or sulfur, is soaked with mercuric chloride and thence subjected to the action of a gas containing hydrogen sulfide; thereby the complete conversion of the mercuric chloride into mercuric sulfide is effected. For this purpose gases may be used containing, for example, from about 0.5 to 500 mg of hydrogen sulfide per liter. The slight charge of sulfur necessary for a working catalyst with active carbon or alumina may be obtained simultaneously with the formation of the mercury sulfide when a gas containing hydrogen sulfide and small quantities of oxygen is used. For this purpose, gases containing from about 0.5 to 500 mg of hydrogen sulfide and from about 0.02 to 0.2 mg of oxygen per liter can be used. Similar compositions are readily available, e.g., stripping gases obtained in various processes.

The catalysts thus obtained have an excellent mechanical resistance and a long life. The humidity of the gas to be purified does not alter operation.

The active carbon or alumina catalyst will work as long as it contains sulfur. Once it has been exhausted, the catalyst can be reactivated by charging it with traces of sulfur.

Of course, different techniques for the preparation and regeneration of the catalysts via other chemical reactions suitable for generating on the surface of the carrier mercuric sulfide and sulfur, afford equally good results.

The catalytic compositions thus obtained are suited for use as filtering media for gas masks to be used in atmospheric contamined by mercury.

For example, the filter of the gas masks may be charged with an active carbon catalyst. When the atmosphere is equally contamined with other noxious substances, the catalyst may be used in the presence of diverse layers of other suitable filtering materials.

To illustrate further the present invention and the advantages thereof, the following specific examples are given, it being understood that these are merely intended to be illustrative and not limitative.

EXAMPLE 1

1.5–2 mm, particle size, carbon "Norit" was immersed for about 1 hour at room temperature in an aqueous solution saturated with mercuric chloride. Upon removal from this solution, the active carbon was subjected for about 4 days to the action of a gas containing about 0.6 mg/l of hydrogen sulfide and about 0.02 mg/l of oxygen. After this treatment, the catalyst was then washed with water and then dried with warm nitrogen.

The catalyst thus obtained contains 77.7 mg of mercuric sulfide and 9.2 mg of sulfur per gram of carbon.

800 cm$^3$ of catalyst were introduced into a gas mask filter. Successively, 80 liters of air per minute were made to pass through the filter at room temperature (about 25° C). The content of mercury in the air at the inlet of the filter amounts to about 19 mg/m³. The mercury contents recorded during 25 hours running at the outlet of the filter never exceeded 25γ/m³

EXAMPLE 2

Crystalline sulfur of about 3 mm particle size was immersed for about 1 hour, at room temperature, in an aqueous solution saturated with mercuric chloride. After removing the sulfur from the solution, the sulfur was subjected for about 2 days to the action of a gas containing about 0.5 gr/l of hydrogen sulfide. After this treatment, the catalyst was washed with water and then dried in a current of warm nitrogen.

The catalyst thus obtained was introduced into an absorption tower maintained at 75° C into which nitrogen containing 4,000γ/m³ of mercury were flowed through at atmospheric pressure and at a space velocity of 3,000 per hour. The content of mercury in the nitrogen measured at the outlet of the tower corresponded to about 2 γ/m³.

EXAMPLE 3

A catalyst of about 4–5 mm. particle size, obtained according to the method described in example 1, were introduced into an absorption tower into which nitrogen with a content of about 250 γ/m³ of mercury were flowed through at room temperature (about 25° C) and at atmospheric pressure, at a space velocity of 8,000 per hour. The content of mercury in the nitrogen measured at the outlet of the absorption tower was lower than 1 γ/m³.

EXAMPLE 4

A catalyst of about 4–5 mm. particle size, obtained according to the method used in example 1, was introduced into an absorption tower into which nitrogen containing 1,000 γ/m³ of mercury was flowed through at room temperature (about 25° C) and at atmospheric pressure, at a space velocity of about 4,000 per hour. The content of mercury in the nitrogen measured at the outlet of the tower was less than 1 γ/m³.

EXAMPLE 5

This last example refers to the purification of electrolytic hydrogen contamined with mercury.

A catalyst of about 4–5 particle size, obtained according to the method described in example 1, was introduced into an absorption tower into which hydrogen was introduced which had a pressure of about 28 atm. and a temperature of about 8° C, at a space velocity of about 3,000 per hour. The hydrogen to be purified has a content in mercury of about 250 γ/m³ - standard conditions. At the outlet of the tower, the content in mercury was less than about 1 γ/m³ -standard conditions after 7,000 hours of continuous operation.

The hydrogen thus purified was particularly suited for use in various chemical reactions such as the synthetis of ammonia, in the oxo-synthesis and in the hydrogenation of aldehydes, inasmuch as almost total absence of mercury in hydrogen allows an excellent operation and ensures a long catalyst life.

As many variations of this invention may be made without departing from the spirit and scope thereof, it is to be understood that the invention is not limited to the specific embodiments thereof except as defined in the appended claims.

What is claimed is:

1. In a process for the purification of gases contaminated with mercury, by bringing said gases into intimate contact with sulfur, whereby mercuric sulfide is formed, the improvement comprising treating said gases, at the outset of absorption, with an absorbent consisting essentially of minor proportion of crystalline sulfur and a major proportion of mercuric sulfide, at a temperature of from 0° to 75° C., at a pressure of from atmospheric to about 30 atmospheres and at a space velocity of up to 10,000 per hour.

2. A process according to claim 1, wherein the purification is conducted at room temperature and at a space velocity of from 3,000 to 4,000 per hour.

* * * * *